July 28, 1964 L. PODOLSKY 3,142,158

THERMOELECTRIC COOLING DEVICE

Filed May 28, 1962 2 Sheets-Sheet 1

INVENTOR
LEON PODOLSKY

BY Frederick Breitenfeld
ATTORNEY

THERMOELECTRIC COOLING DEVICE

Filed May 28, 1962 2 Sheets-Sheet 2

INVENTOR.
LEON PODOLSKY
BY
Frederick Breitenfeld
ATTORNEY 3,142,158
Patented July 28, 1964

3,142,158

THERMOELECTRIC COOLING DEVICE

Leon Podolsky, 77 Wendell Ave., Pittsfield, Mass.
Filed May 28, 1962, Ser. No. 198,286
14 Claims. (Cl. 62—3)

This invention relates generally to thermoelectric cooling devices, and more particularly to devices in which passage of current through a thermocouple is caused to produce the desired effect.

Other aspects of the invention relate to a method of making such cooling devices, a method of using such devices, a method of producing oriented graphite, a method of coating a body with oriented graphite, and a furnace for the deposition of oriented graphite.

It is of course well known that when two dissimilar metals, or other electrically conductive materials, are placed in contact thereby forming a thermocouple, and an electric current is passed through them in a certain direction, a reduction in temperature takes place at the junction between the two materials. It is a general object of the present invention to produce such a cooling effect by means of a novel device in which one wall of the thermocouple is the boundary of an enclosed region within which the cooling is to be effected.

It is another object of the invention to provide a novel method of making such a cooling device by depositing one element of a thermocouple in the form of a film or coating onto the other element of the couple.

Another object is to provide a cooling device in which pairs of such deposited film are used to advantage in a unique fashion to provide enhanced cooling of the wall on which they are deposited.

A further object is to provide a device whose structural nature is such that its usefulness as a cooling instrument is of unusually wide scope. Merely by way of example, the invention will be illustrated and described in connection with the cooling of a liquid, such as blood, flowing through a tube, but it is to be understood that the invention is by no means restricted in its usefulness or applicability.

The invention has been successfully employed to cool blood flowing to a particular part of the body, such as an organ or limb, during a surgical operation in order to cool that part of the body and thus lessen the effects of the surgery and prolong the safe working time of the surgeon. In the case of such a surgical tool, a metal tube through which the blood flows serves as the self-sustaining member of a thermocouple, and the tube carries on its outer surface an electrically conductive film. The tube and film form a thermocouple which, when connected in series to a source of electric current, becomes cooled. Hence, if the tube is interposed between the severed ends of a blood vessel, the temperature of the blood flowing through, and contacting the inner surface of, the tube is reduced.

It is thus an object of the invention, broadly, to provide a device for cooling a fluid, particularly a liquid, for example, blood, flowing continuously through a tube or conduit.

The film or coating on the tube or wall may be any of many different materials as, for example, the familiar semiconductor materials. A preferred material, however, is graphite, because of its stability, ability to withstand repeated heating (for sterilization, e.g.), and immunity to immersion effects. However, as discussed in applicant's co-pending application, Serial No. 195,681 filed May 18, 1962, in order that the graphite have a maximum "figure of merit" the crystals of the graphite film must have a particular orientation with respect to the flow of electric current through the graphite. It is therefore a further object of the invention to provide a method for producing a coating of graphite wherein the graphite crystals have a predetermined orientation.

It is an additional object of the invention to provide a cooling device employing a graphite film the crystals of which are arranged with their "*c*" axes in the direction of electric current flow through the film when the device is in operation.

It is yet another object of the invention to provide a method for producing graphite, the crystals of which are all, or substantially all, oriented with their "*c*" axes in a single direction.

It is still a further object of the invention to provide a deposition furnace of special character capable of depositing a film of graphite on a metal tube, to form a thermoelectric cooling device for fluids, the crystals of the graphite film being oriented with their "*c*" axes perpendicular to the surface of the tube.

Other objects and advantages will be apparent from the following detailed description of one embodiment of the invention, and one method of making that embodiment.

Figures 1, 2:
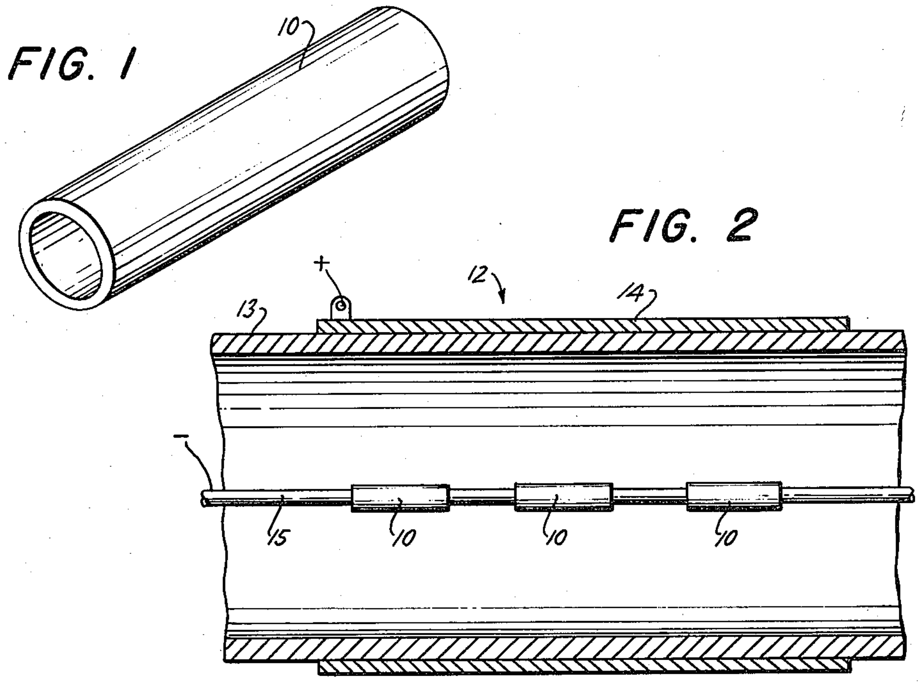
FIG. 1 is a perspective view of a metal tube.
FIG. 2 is a cross-sectional view of a furnace for depositing an oriented graphite film on tubes such as the one shown in FIG. 1.
Figure 3:
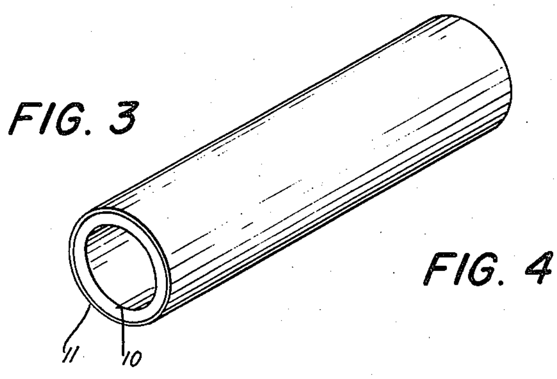
FIG. 3 is a view similar to FIG. 1 showing the tube carrying a graphite film on its outer surface.

The embodiment of the invention chosen for illustration is a device for cooling blood as it flows through a blood vessel. However, it is understood that the invention is not limited to this particular use. For example, the wall of the metal tube illustrated might be thought of as a wall defining any enclosed region to be refrigerated.

The tube 10 may be made of any "stainless" metal, such as nickel, molybdenum, or stainless steel, and for blood cooling purposes its preferred dimensions are ⅛–⅜ inch in diameter, .015–.020 inch wall thickness, and ½–3 inches in length. The tube 10 is coated with a film 11 of electrically conductive material, the material chosen being, in a special predetermined way, electrically dissimilar from the metal of the tube. Consequently, a thermocouple is produced, the tube wall being one element of the thermocouple and the film being the second element.

Many different materials may be employed to coat the tube 10. For example, the familiar semi-conductor materials such as bismuth telluride, germanium silicide, and other alloys formed from the metals of group III and group V or VI of the periodic table of elements are desirable because of their characteristically high "Figures of Merit." In general, the invention is not limited to the use of any particular material for forming either the metal wall or the coating. All that is required is that the materials employed for the wall and coating be so electrically dissimilar that application of the coating to the wall produces a thermocouple. For purposes of a blood cooling device, the preferred coating material is graphite because of its stability, its ability to withstand repeated heating for sterilization, and its immunity to liquid immersion effects.

As is well known, the performance characteristics of thermoelectric devices can be conveniently rated by a value known as the "Figure of Merit." This parameter is proportional to the square of the thermoelectric E.M.F., and inversely proportional to resistivity and thermal conductivity of the couple, all measured in the direction of current flow through the junction of the thermocouple, and the "Figure of Merit" is advantageously as high as possible. Whereas graphite has the desirable rugged qualities mentioned above, it does not exhibit a high enough "Figure of Merit" for practical purposes unless deposited on the tube and treated in a manner such as the one now to be described.

The metal tubes 10 may be provided with a graphite coating 11 in a deposition furnace 12. Deposition furnaces are well known and may include a cylindrical shell 13 into which is introduced a hydrocarbon gas, such as methane, and which is heated, as by electric means, to a temperature (of the order of 2100° F.) capable of burning and cracking the hydrocarbon gas. According to the present invention the shell 13 of the furnace is girdled by an outer tubular electrode 14. A metal rod 15 serving as an inner electrode extends longitudinally through the furnace. The rod is appropriately formed to carry the metal tubes 10 to be coated. Throughout the cracking operation which causes crystalline graphite to be deposited on the relatively cool surfaces of the tubes 10, a high direct current potential difference is applied between the electrodes 14 and 15 producing an intense electrostatic field within the furnace. An electrostatic field of several thousand volts per inch is usually employed. The direction of this field will obviously be perpendicular to every point on the outer surface of each tubes 10, a high direct current potential difference is apgraphite crystals to be deposited with their "*c*" axes in the direction of the field, i.e., the "*c*" axes of the deposited crystals will be perpendicular to the surface of the tube upon which they are deposited.

A graphite crystal exhibits along its "*c*" axis its highest thermoelectric E.M.F. and its lowest thermoconductivity (both favorable factors as far as "Figure of Merit" is concerned). However, the resistivity along this axis is highest, a factor which normally tends to reduce the "Figure of Merit." Nevertheless, when the graphite is employed in the form of a thin film or coating, and the direction of current flow is transversely through the film, the resistivity is negligible even through the current flow is along the "*c*" axis.

In the drawings, the thickness of the film has been greatly exaggerated for clarity. In practice, the film is ordinarily less than twenty microns in thickness.

Figure 4:
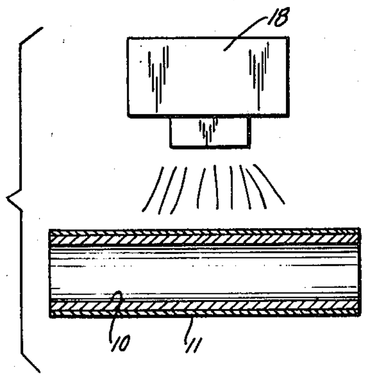
FIG. 4 shows the step of irradiating the graphite film by penetrating radiation.

The coated tubes are then preferably subjected to penetrating radiation, as indicated in FIG. 4, emitted by any standard source 18. The term "penetrating radiation" is intended to be used in its radioactive sense, i.e., it alludes to radiation capable of penetrating through one mm. of lead. For example, gamma rays, hard X-rays, neutrons, or other atomic particles can be used. Electron bombardment might be obtained from a multi-million-volt electrostatic accelerator; or gamma rays might be obtained from atomic piles or radioactive isotopes.

The exact source and nature of the radiation is not critical, so long as it is sufficiently intense to cause a large number of defects in the crystal lattice of the graphite. It is known that the exposure of crystals, notably those of graphite, to penetrating radiation increases the existing number of lattice defects and thus increase the thermoelectric voltage obtainable from a material thus treated.

The tube 10 and film 11 are, of course, a thermocouple, and if the film is connected to one terminal of an electrical source and the tube to the other terminal, the tube and film experience a reduction in temperature. A feature of the invention is to employ such a thermocouple as one of a pair. This greatly simplifies the manufacturing procedure, and enhances the cooling effect in an unusually simple and effective manner. It also facilitates the employment of the device as an insert in an existing conduit such as a blood vessel, since both terminals of the applied current source can be formed on the coating, leaving the tube itself free for coupling at both ends with the blood vessel or other tube with which it is to be associated.

In order to permit both terminals of the electrical source to be connected to the graphite film, one portion of the film must be electrically positive with respect to the metal of the tube, and another portion electrically negative. The graphite film is naturally electrically positive, and hence a portion of the film must be treated to make it electrically negative with respect to the tube.

Figure 5:
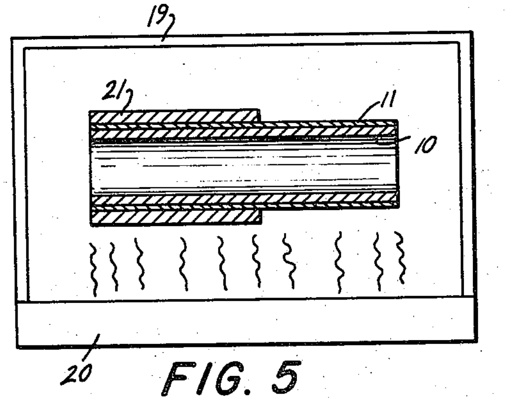
FIGS. 5 and 6 show the steps of infusing atoms of different materials into the graphite crystal lattices.

One way of accomplishing this is to infuse into the lattices of the graphite crystals atoms of a material capable of rendering the graphite film relatively electrically negative. One such material is molybdenum disilicide ($MoSi_2$). The $MoSi_2$ may be infused into the graphite crystal lattices by means of a vacuum chamber 19 (FIG. 5) open to a source 20 of $MoSi_2$ vapor. Before the coated tube is placed into the vacuum chamber, it is masked for slightly more than one-half its length by a metallic mask 21. Consequently, the $MoSi_2$ atoms become diffused into the lattices of the graphite crystals on the unmasked portion of the tube only. The tube may be rotated over the source of vapor 20 to insure that the entire unmasked portion of the film is exposed to the vapor. After a few minutes of exposure, enough atoms are infused into the graphite film to make it electrically negative with respect to the tube.

Figure 6:
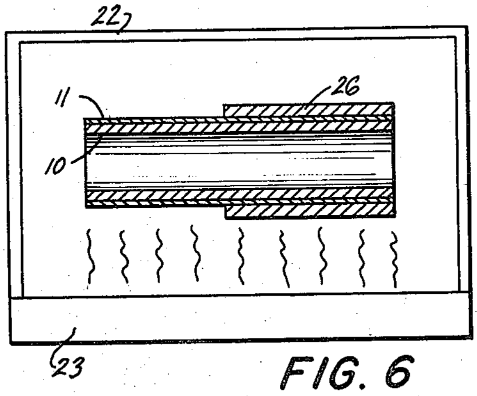

Thereafter, if desired, atoms of a metal, preferably an alkali metal such as potassium, may be infused into the crystal lattices of the previously masked portion of the graphite film. The purpose of this step is to reduce the already low electrical resistance of the graphite film. Infusion of the metal atoms may be brought about as shown in FIG. 6, in a vacuum chamber 22, identical to the vacuum chamber 19, except that it is open to a source 23 of metal vapor. While alkali metals are preferred, others may also be used, particularly boron, silicon, and molybdenum.

Before the tube is placed into the vacuum chamber 22, the previously unmasked portions of the tube and the film are masked by means of a metallic mask 26. The mask 26, like the mask 21, is slightly longer than one-half the length of the tube 10. Consequently, as indicated in FIG. 7, a portion "A" of the film 11 slightly less than one-half the length of the tube 10 will be infused with atoms of $MoSi_2$ or equivalent material, a portion "B" also slightly less than one-half the length of the tube will be infused with atoms of potassium or equivalent material, and a central buffer portion "C" will be free of infused atoms.

Figure 7:
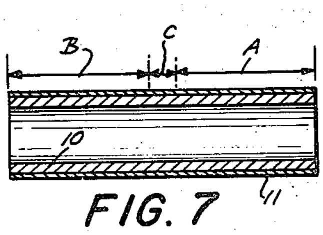
FIG. 7 is a cross-sectional view of the graphite-coated tube after the steps shown in FIGS. 5 and 6.
Figure 9:
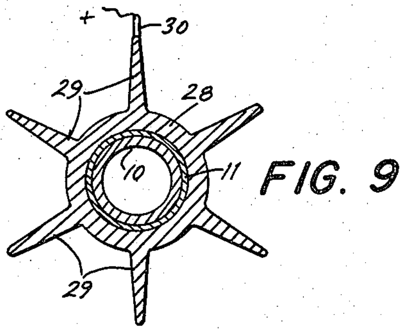
FIG. 9 is a cross-sectional view taken along the line 9—9 of FIG. 8.

In order to make a blood cooling device from the coated tube of FIG. 7, the graphite adjacent to the ends 27 (see FIG. 8) of the tubes is scratched off, and the remaining regions of the film portions "A" and "B" are coated with a good contact metal such as copper, zinc, nickel, or gold. This coating may be effected by vacuum deposition in which case the portion "C" of the film and the regions adjacent to the ends of the tube are masked before placing the tube in the vacuum chamber. Thereafter, a contact band 28 is placed over each of the metal coated regions of the graphite film (see FIGS. 8 and 9 in which the metal coatings have not been shown for the sake of clarity). These contact bands are fluted or ribbed to provide fins 29 to aid in the dissipation of heat, and each band is provided with a terminal 30 for connection to a source of electric current. The contact bands may be formed of sheet metal or preferably are die cast of zinc or aluminum.

Figure 8:
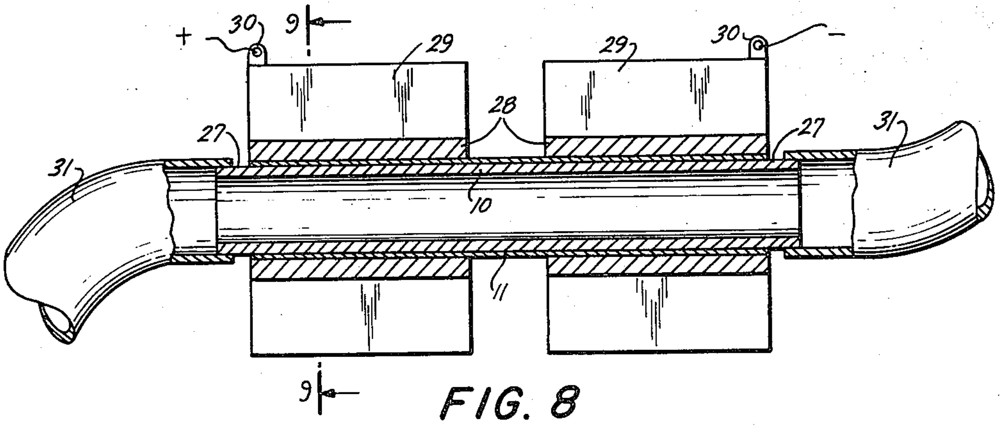
FIG. 8 is a cross-sectional view of a blood cooling device fabricated in accordance with the present invention disposed between the severed ends of a blood vessel.

When a device according to the present invention is to be used to cool a particular part of the human body during surgery, the blood vessel 31 supplying blood to that part of the body is severed, and the cooling device is interposed between the severed ends of the blood vessel as shown in FIG. 8. The severed ends of the blood vessel are secured to the opposite ends 27 of the cooling device so that the blood flowing through the blood vessel is conducted through the tube 10 and contacts the inner wall of the tube. The terminals 30 are connected to a source of direct current preferably through a current limiting device such as a rheostat. The current flows radially inwardly through one contact band 28 and the portion of the graphite film directly beneath it and into the metal tube 10. As it passes the junction between the film and tube it produces a decrease in temperature in the tube. The current continues longitudinally along the tube and then flows radially outwardly through the other contact band 28 and the portion of the graphite film directly beneath it. As the current passes the junction between this latter portion of the film and the tube it produces a further cooling of the tube. Hence the blood flowing through the tube 10 and contacting it will be cooled, and the part of the body to which the blood flows immediately thereafter will also be cooled. Furthermore, by regulating the current flowing into the device, as by means of the rheostat, it is possible to adjust the amount of cooling produced and accurately regulate the temperature of the fluid flowing, even to fractions of a degree.

A specific example of a cooling device constructed in accordance with this invention will now be given. A nickel tube two inches in length, ¼ inch in diameter, having a wall thickness of .020 inch, and coated with a graphite film, as described above, was provided with two contact bands each having six fins disposed at 60° angles, each pair of diametrically opposite fins measuring ½ inch from tip to tip. Upon passage of a direct current of five volts and ten amperes through the device it experienced a temperature drop of 65° C.

It will be seen that a cooling device according to this invention is rugged, readily cleanable in water and solvents, and is not damaged by repeated heating in the usual sterilization procedures. Furthermore, it exhibits a relatively large "Figure of Merit" due to the following factors: the current path from contact band through the film, either graphite or semi-conductor, is very short, being only the film thickness, and is large in cross-sectional area resulting in very low series resistance of the couple; the oriented and radiated graphite generates a relatively large thermal E.M.F., and the orientation of the graphite substantially reduces thermal conductivity.

The invention has been shown and described in terms of a tubular cooling device for fluids, particularly blood. However, it is obvious that the invention has much broader significance with respect to thermocouples in general and cooling devices in particular. It is understood, therefore, that the invention is not limited to any specific form or embodiment except insofar as such limitations appear in the appended claims.

What is claimed is:

1. A thermoelectric cooling device comprising a metal wall, a thin film of electrically conductive material coated on said wall, said wall and film being of such materials as to comprise a thermocouple, and means for connecting said wall and film in series with a source of electric current whereby as said current flows through said wall and film their temperature will decrease.

2. A device according to claim 1 wherein the material of said film is a semiconductor material.

3. A device according to claim 1 wherein the material of said film is graphite.

4. A device according to claim 1 wherein said wall forms part of an enclosure defining a refrigerated region.

5. A device according to claim 1 wherein said wall forms a tube through which a fluid flows, and said film is disposed on the outer surface of said tube.

6. A device according to claim 1 wherein said film is electrically positive with respect to the metal of said wall, and wherein said device includes a second thin film of electrically conductive material coated on a different region of said wall, said second film being electrically negative with respect to the metal of said wall, each of said films comprising together with said wall a thermocouple, and wherein said connecting means are arranged to connect said thermocouples in series with a source of electric current whereby as current flows through said thermocouples the temperature of said wall will decrease.

7. A thermoelectric cooling device comprising a metal wall, a graphite film coated on said wall, the graphite covering a portion of said wall being infused with atoms of a material which render that portion of the graphite film electrically negative with respect to the metal of said wall, the remaining portion of said film being electrically positive with respect to the metal of said wall, the two portions of said film forming together with said tube two thermocouples in series, and means for connecting the two thermocouples to a source of electric current in order to reduce the temperature of said wall.

8. A cooling device according to claim 7 wherein the crystals of said graphite are so oriented that their "*c*" axes are perpendicular to the surface of said wall.

9. A cooling device according to claim 8 wherein the lattices of the crystals of said graphite film have defects caused by exposure to penetrating radiation.

10. A cooling device according to claim 7 wherein said infused atoms are molybdenum disilicide.

11. A cooling device according to claim 7 wherein said remaining portion of said film is infused with metal atoms to reduce its resistivity.

12. A cooling device according to claim 7 wherein there is a region to be cooled adjacent to said wall and wherein said electrical connection means include a metal layer covering each of said graphite film portions, and a metal contact element covering each of said metal layers, said contact elements each having a terminal for connection to an electrical conductor and a plurality of metal fins to aid in dissipating the heat extracted from the region adjacent to said wall.

13. A device for cooling a fluid flowing continuously through a conduit comprising a metal tube through which the fluid is conducted, a thermocouple for cooling said metal tube, said tube forming one element of said thermocouple, and means for supplying electric current to said thermocouple whereby as the current flows through said thermocouple the tempertaure of said tube will decrease and wherein the other element of said thermocouple is a film of electrically conductive material coated on the outer surface of said tube.

14. A thermoelectric cooling device for a flowing fluid, comprising an electrically conductive metal tube through which the fluid flows, electrically conductive coatings on adjacent spaced parts of the external surface of the tube, one of said coatings being composed of a material that is electropositive with respect to the metal of the tube, the other coating being composed of a material that is electronegative with respect to said tube, and means for establishing an electrical potential difference between said coatings so that current will flow from one to the other through said tube.

References Cited in the file of this patent

UNITED STATES PATENTS

| | | |
|---|---|---|
| 413,136 | Dewey | Oct. 15, 1889 |
| 2,280,137 | Wiegand | Apr. 21, 1942 |
| 2,451,703 | Weiss | Oct. 19, 1948 |
| 2,779,172 | Lindenblad | Jan. 29, 1957 |
| 2,784,695 | Dickey | Mar. 12, 1957 |
| 2,794,751 | Juvinall | June 4, 1957 |
| 2,807,657 | Jenkins | Sept. 24, 1957 |
| 2,839,425 | Juvinall | June 17, 1958 |
| 2,845,929 | Strumia | Aug. 5, 1958 |
| 2,858,798 | Sedlacsik | Nov. 14, 1958 |
| 2,876,769 | Cordova | Mar. 10, 1959 |
| 2,919,553 | Fritts | Jan. 5, 1960 |
| 2,934,067 | Calvin | Apr. 26, 1960 |
| 2,959,017 | Gilman | Nov. 8, 1960 |
| 2,959,925 | Frantti | Nov. 15, 1960 |
| 3,000,092 | Scuro | Sept. 19, 1961 |
| 3,064,649 | Fuson | Nov. 20, 1962 |
| 3,074,401 | Friedman | Jan. 22, 1963 |